United States Patent [19]

Drake et al.

[11] Patent Number: 5,106,795
[45] Date of Patent: Apr. 21, 1992

[54] CHROMIC OXIDE REFRACTORIES WITH IMPROVED THERMAL SHOCK RESISTANCE

[75] Inventors: Douglas A. Drake, Louisville, Ky.; Charles N. McGarry, Clarksville; Thomas M. Wehrenberg, Jeffersonville, both of Ind.

[73] Assignee: Corhart Refractories Corporation, Louisville, Ky.

[21] Appl. No.: 358,776

[22] Filed: May 26, 1989

[51] Int. Cl.$^5$ ............................................. C04B 35/12
[52] U.S. Cl. ................................. 501/126; 501/132
[58] Field of Search ........................... 501/126, 132

[56] References Cited

U.S. PATENT DOCUMENTS

| | | | |
|---|---|---|---|
| 2,498,622 | 2/1950 | Mochel | 501/132 |
| 3,773,531 | 11/1973 | Manigault | 501/132 |
| 4,054,627 | 10/1977 | Ownby | 501/126 |
| 4,298,385 | 11/1981 | Claussen et al. | 501/105 |
| 4,374,897 | 2/1983 | Yamaguchi | 501/132 |
| 4,533,647 | 8/1985 | Tien | 501/105 |
| 4,647,547 | 3/1987 | Singh et al. | 501/103 |

FOREIGN PATENT DOCUMENTS

| | | | |
|---|---|---|---|
| 2070258 | 3/1987 | Japan. | |
| 0657003 | 4/1979 | U.S.S.R. | 501/132 |
| 0542550 | 1/1942 | United Kingdom | 501/132 |

Primary Examiner—William R. Dixon, Jr.
Assistant Examiner—Sue Hollenbeck
Attorney, Agent, or Firm—Panitch Schwarze Jacobs & Nadel

[57] ABSTRACT

Refractory compositions comprising at least eighty percent or more by weight $Cr_2O_3$ densified by the addition of at least one-half percent and preferably about four percent $TiO_2$ have about one-quarter percent to about fifteen percent by weight relatively finely divided monoclinic zirconia particles substantially uniformly dispersed therethrough to induce microcracks in the densified chromic oxide and improve thermal shock damage resistance of the refractory. Zirconia additions of up to at least five percent by weight exhibit the high glass corrosion resistance of similar densified chromic oxide compositions without zirconia.

56 Claims, No Drawings

CHROMIC OXIDE REFRACTORIES WITH IMPROVED THERMAL SHOCK RESISTANCE

FIELD OF THE INVENTION

The invention relates to chromic oxide ($Cr_2O_3$) refractories and, in particular, to densified chromic oxide refractories having improved thermal shock damage resistance while maintaining or offering improved high glass corrosion resistance.

BACKGROUND OF THE INVENTION

Chromic oxide refractory bodies are often used in glass production due to the superior corrosion resistance of chromic oxide.

Generally speaking, glass corrosion resistance of chromic oxide refractory is enhanced by increasing the density and concentration of chromic oxide to eliminate pores which may permit melted glass or slag intrusion and to eliminate other refractory components having less glass corrosion resistance than the chromic oxide. The pores and other components each provide potential sites for corrosion and/or erosion to begin.

Densification of chromic oxide has been obtained by sintering a mixture of chrome sesquioxide ($Cr_2O_3$), sometimes also called unreacted or "green" or trivalent chromic oxide, with titania ($TiO_2$) in a very low or no oxygen content atmosphere. Pure chromic oxide refractories fired without a densifying agent like titania have a maximum bulk density of only about 215 lbs/ft$^3$. Bulk densities of up to 300 lbs/ft$^3$ and more have been achieved using titania as a densifying agent.

Chrome sesquioxide particles are formed from clusters of individual crystals which, under microscopic examination, have the general appearance of clusters of grapes. When fired at a sufficiently high temperature, between about 1450° C. and 1600° C., some of the individual chromic oxide crystals grow in size by the absorption of other chromic oxide crystals, while the bulk volume of the material decreases and the bulk density of the material increases.

During densification, titania will enter into solid solution with the chromic oxide as chrome titanate. The amount of titania entering into solid solution is relatively small. A saturated solid solution of chromic oxide and chrome titanate is formed by the combination of chromic oxide with only two to three additional weight percent titania. The densification or increase in bulk density of the chromic oxide also appears to be directly proportional to the amount of titania present (chrome titanate in solution), up to the saturation amount of two to three percent titania or its equivalent in chrome titanate. Excess titania may remain in particle form, be reduced to metallic titanium or possibly combine with other compounds which may be present during sintering.

Generally speaking, densification also can be fostered by the use of titania in combination with other finely divided oxides, particularly silica, to reduce cost by reducing the amount of titania employed.

The term "densified chromic oxide" and like terms are hereinafter used to refer specifically to chromic oxide, the bulk density of which has been increased above about 215 lbs/ft$^3$ by the inclusion of at least some titania in the green mix before firing or otherwise providing chrome titanate in solution with the chromic oxide during firing.

Densification of chromic oxide has also been reported, at least on a laboratory scale, by the firing of chromic sesquioxide in a bed of carbon in a carbon reducing atmosphere. The formation of chromium carbide by reaction of the chromic oxide and carbon is reported to occur. The specific chemical make-up, thermal shock performance and glass corrosion resistance of this material are unreported. However, carbides are to be avoided in all molten glass contact applications.

The term "sinterable components" is used to refer to metals, metallic oxides, glasses and other materials which remain in a refractory in some form after sintering. These are distinguished from water, volatiles and combustibles which evaporate or are driven out of the composition or consumed (oxidized to a gaseous form) before or during the sintering process.

The term "dense chromic oxide" is used to refer in particular to refractories which are predominantly densified chromic oxide matrix (eighty percent or more by weight $Cr_2O_3$) and have a bulk density of at least about 240 and no more than about 255 lbs/ft$^3$. The term "very dense chromic oxide" is used to refer to refractories which are predominantly densified chromic oxide matrix (about eighty percent or more by weight $Cr_2O_3$) and have a bulk density of at least about 255 and no more than about 285 lbs/ft$^3$. The term "high density chromic oxide" is used to refer to refractories which are predominantly densified chromic oxide matrix (about eighty percent or more by weight $Cr_2O_3$) and have a bulk density of at least about 285 lbs/ft$^3$ or more.

The purification and densification of chromic oxide to increase corrosion resistance typically reduces that material's resistance to thermal shock damage. Thermal shock damage is physical damage such as spalling, cracking and/or fracturing resulting from rapid and/or extreme temperature changes.

Normally, thermal shock damage resistance of dense ceramic bodies can be improved to a certain degree by various means, particularly the use of coarse aggregates. Other means include increased porosity (open or closed), heterogeneous particle densities, and chemistry changes of the base material in the matrix by forming a solid solution of it with another material.

The thermal shock damage resistance of densified chromic oxide has been heretofore improved by the addition of coarse aggregates, namely densified chromic oxide grog. Dense and very dense chromic oxide blocks have been produced this way for use in or in connection with glass furnaces as furnace linings and other glass and slag contact bodies such as flow and bushing blocks. Such chromic oxide refractories are used particularly in the production of textile glass fiber, insulating wool glass fiber, borosilicate glasses and certain other specialty glasses which are considered especially corrosive. This means of enhancing thermal shock resistance in chromic oxide refractories represents a compromise between minimum necessary thermal shock damage resistance and diminished corrosion-/erosion resistance.

To reduce the damage from thermal shock in such prior densified chromic oxide refractories used as glass furnace linings, furnace operators have had to carefully control and modify their operating procedures, for example, by providing extremely slow heat-up and cool-down rates, using pressurized heat, etc. It is not uncommon for prior densified chromic oxide refractory blocks forming the lining of a glass melting furnace to crack during the initial heat-up of the furnace, even when such special precautions are taken. Since such furnaces are intended to be in continuous operation for years, even relatively minor thermal shock damage leading to accelerated, localized corrosion/erosion can have a significant impact on the economics of the furnace.

It would be highly valuable to provide chromic oxide refractories having glass corrosion resistance at least comparable to if not greater than those of current densified chromic oxide refractory compositions used in glass furnace applications while providing improved thermal shock resistance.

SUMMARY OF THE INVENTION

In one aspect, the invention comprises a densified chromic oxide refractory composition having a bulk density of at least about 240 lbs/ft$^3$ and comprising at least about eighty percent by weight $Cr_2O_3$, at least about one-half percent by weight $TiO_2$ and at least about one-quarter percent by weight monoclinic zirconia in particle form substantially uniformly dispersed throughout the composition.

In another aspect, the invention comprises a method of making a densified chromic oxide refractory having improved thermal shock damage resistance comprising the steps of forming a green composition of mixed sinterable components into a shape, the sinterable components comprising at least about eighty percent by weight $Cr_2O_3$ provided by particles selected from the group consisting essentially of chrome sesquioxide, chromic oxide grog and mixtures thereof, at least about one-half percent $TiO_2$ and at least about one-quarter percent by weight monoclinic zirconia particles; and heating the green composition shape to a temperature of at least about 1450° C. throughout to sinter and densify the green composition. The invention further includes the sintered refractory shape formed by the aforesaid method.

Another aspect of the invention is a green composition of mixed sinterable components, the sinterable components consisting essentially of: at least about eighty percent by weight $Cr_2O_3$ provided by particles selected from the group consisting essentially of chrome sesquioxide, chromic oxide grog and mixtures thereof; at least about one-half percent by weight $TiO_2$ and at least about one-quarter percent by weight monoclinic zirconia in particle form dispersed substantially uniformly through the composition.

In another aspect, the invention includes in a glass melting furnace, a densified chromic oxide refractory composition having a bulk density of at least about 240 lbs/ft$^3$ and comprising at least about eighty percent by weight densified $Cr_2O_3$, at least about one-half percent $TiO_2$, and at least about one-quarter percent by weight monoclinic zirconia in particle form dispersed substantially uniformly through the composition.

DETAILED DESCRIPTION OF PREFERRED EMBODIMENTS

It has been found that resistance to thermal shock damage in densified chromic oxide refractories can be noticeably and even greatly improved by even relatively minor additions of relatively fine particulate monoclinic (unstabilized) zirconia with no immediate loss in glass corrosion resistance.

This improvement in thermal shock damage resistance is believed to be due to the unique thermal expansion characteristics of monoclinic (unstabilized) zirconia which undergoes a phase change (to or from tetragonal) and changes in thermal expansion rate and magnitude at about 1160° C.

Due to the substantially different thermal expansion characteristics (rate and magnitude) of the chromic oxide and monoclinic zirconia particles, zonal stress concentrations and microcracks are formed in the cooling densified chromic oxide matrix by the expanding zirconia particles which are dispersed substantially uniformly throughout the densified chromic oxide matrix. These microcracks, in effect, stress relieve the refractory composition and minimize thermal crack propagation. The zonal stress concentrations and microcracks act as "crack stoppers" affecting the thermal shock resistance of the entire refractory in a positive manner. Microcracking was observed around and/or adjacent to substantially all zirconia particles identified in transectional micrographs of those refractory compositions exhibiting improved thermal shock damage resistance which were examined. It is therefore believed that such microcracking must be present in the vicinity of at least a major proportion (by weight) of all of the monoclinic zirconia particles present. Microcracking was observed at magnifications about $1000\times$ or more and is more easily seen in back scatter SEM images.

Refractory compositions of the present invention comprise and generally consist essentially of at least about eighty percent by weight chromic oxide ($Cr_2O_3$) densified with $TiO_2$ and including monoclinic zirconia in particle form substantially uniformly dispersed throughout the composition to provide the thermal shock damage resistance improvement.

Compositions of most interest are at least about eighty-eight percent, preferably at least about ninety percent, in some cases, preferably at least about ninety-two percent by weight $Cr_2O_3$. The chromic oxide compositions of interest have bulk densities of at least about 240 lbs/ft$^3$. For certain applications bulk densities of at least 255 lbs/ft$^3$ and even at least about 285 lbs/ft$^3$ with about eighty-eight and even ninety percent or more by weight $Cr_2O_3$ are preferred.

The compositions currently of most interest include about ten percent or less, desirably only about five percent or less and, preferably only about three percent or less by weight of the monoclinic zirconia for improved thermal shock damage resistance with high glass corrosion resistance.

High density chromic oxide compositions about ninety-four percent or more by weight $Cr_2O_3$ with between about one-quarter and one percent by weight monoclinic zirconia demonstrate or are expected to demonstrate thermal shock damage resistance superior to existing very dense chromic oxide compositions currently commercially employed.

$TiO_2$ may be provided in green compositions by particulate titania, chrome titanate in chromic oxide grog, or from other sources. At least about one-half percent $TiO_2$ is theoretically necessary to achieve the necessary densification to provide the minimum bulk density of 240 lbs/ft$^3$ in compositions of at least about eighty percent $Cr_2O_3$. $TiO_2$ is preferably added to the $Cr_2O_3$ present at a ratio of about 1 to 24. Preferably too, $TiO_2$ is limited to about six percent or less by weight of the composition to maintain high glass corrosion resistance.

To the extent that refractory components other than $Cr_2O_3$, $TiO_2$ and monoclinic zirconia are present, preferably they should constitute no more than about ten percent by weight the refractory composition to maintain glass corrosion resistance at levels comparable with existing compositions consisting essentially of densified chromic oxide. The exemplary refractory compositions to be disclosed in the following examples include less than about five percent and typically only between about on and four percent by weight other refractory components. One of ordinary skill will appreciate that the amount of impurities which can be tolerated varies with the uses of the compositions. In instances where relatively coarse chromic oxide grog is used in significant amounts to provide high thermal shock damage resistance and there will not be continuous exposure to molten glass or slag, a relatively small amount of glass may even be desirable (less than about two percent) to increase the cold compression strength of the composition.

Densified chromic oxide refractories according to the present invention may be made by forming an article from a green composition of mixed sinterable components, the sinterable components consisting essentially of: at least about eighty percent, more typically at least about eighty-five, desirably at least about eighty-eight and preferably at least about ninety percent by weight $Cr_2O_3$ provided by particles selected from the group consisting essentially of chrome sesquioxide, chromic oxide grog and mixtures by weight thereof, at least about one-half percent $TiO_2$ preferably in the form of titania particles or chromic titanate in the grog and at least about one-quarter percent by weight monoclinic zirconia. For highest corrosion resistance at least ninety-two percent $Cr_2O_3$ is preferred. Particular compositions should include $TiO_2$ in an amount sufficient to cause densification to at least about 240 lbs/ft$^3$. Particular compositions should also include zirconia particles in amounts sufficient to improve thermal shock damage resistance. Preferably, the compositions include about four percent by weight $TiO_2$, and no more than about five percent by weight monoclinic zirconia. They further preferably include no more than about four percent of other refractory components but again it is recognized that for at least some uses, higher amounts of titania, zirconia and certain other refractory components, for example alumina, silica and/or glass, may be tolerated.

Monoclinic or unstabilized zirconia as used herein includes commercially available products which typically include between about one and one-half to two percent $HfO_2$ and between about one and two percent of other components including water and volatiles. Thermal shock damage resistance may be improved by using partially stabilized zirconias, which are mixtures of monoclinic phase (unstabilized) and cubic phase (stabilized) zirconias. However, microcracking is most optimally induced while minimizing the amount of zirconia (to optimize corrosion resistance) by using zirconias which are considered fully monoclinic or unstabilized.

Thermal shock damage resistance improvement further appears to be related, at least in some degree, to zirconia particle size. Coarse zirconia particles can be used, for example up to about 50 mesh, to enhance thermal shock resistance by increasing heterogeneity. However, the resulting body is likely to have preferential glass corrosion of the larger zirconia particles on the consequent releasing of chromia stones. Smaller sizes are suggested. The following examples indicate that particles more than twenty microns in diameter can be used, at least in limited amounts. Better results appear to be provided by monoclinic zirconias including some significant percentage by weight, such as about twenty percent or more, particles which are less than one micron in diameter. Best comparative results were obtained where the median particle size (50th mass percentile of the zirconia by sedigraphic analysis) was less than two microns. The zirconia particles are generally spherical both in their original form when added to the green compositions and in the sintered refractory compositions of the invention.

Zirconia stabilizing oxides such as CaO, $Y_2O_3$, MgO and the like should be avoided to prevent a complete or even significant stabilization of the zirconia. Thus, the green compositions of this invention lack zirconia stabilizing agents in amounts sufficient to stabilize the monoclinic zirconia present in the composition. Carbides and other compounds highly reactive with molten glass and/or slag should also be avoided. Again, the inclusion of sinterable materials and refractory components other than chromic oxide preferably is minimized to the extent feasible to minimize potential glass corrosion/erosion points in the resulting refractory for optimum glass corrosion resistance. However, depending upon the end use of the refractory compositions, it will be recognized that varying amounts of zirconia, titania and other refractory components can be tolerated in the sintered refractory with the expectation that long term glass corrosion resistance will be adversely affected, particularly by the inclusion of other refractory components with less corrosion resistance than titania or zirconia.

As used in this application, "other refractory components" refers to compounds other than $Cr_2O_3$, $TiO_2$ and the monoclinic zirconia. In the following examples these typically include deposits of metallic titanium, other metallic oxides, glass and glass by-products which will tend to collect in interstices in the chromic oxide.

Chromic oxide may be provided in the green compositions by particles of chrome sesquioxide ($Cr_2O_3$), chromic oxide grog, or both. Grog may be supplied from newly fired chromic oxide refractories (non-densified, partially densified or fully densified) or from dense or very dense chromic oxide refractory blocks which have been recovered from glass furnaces and cleaned of furnace impurities, typically glass and glass by-products such as slag, soda, lime, etc. Recycled densified chromic oxide blocks used in some of the following examples were originally formed by combining about ninety-six percent by weight chromic sesquioxide or its equivalent in grog with about four percent $TiO_2$ in the form of titania or its equivalent in the grog. The recycled blocks were cleaned sufficiently to reduce the weight of other refractory components to only about four additional percent or less. These other refractory components typically reside in the open porosity of the blocks.

To assure an optimum presence of titania for maximum densification of the present compositions, a ratio of about ninety-six percent by weight $Cr_2O_3$ sesquioxide to four percent by weight $TiO_2$ (i.e. 24 to 1) is preferred. In the case of undensified or partially densified chromic oxide grog, equal or proportionately lower amounts of titania to achieve the equivalent of the 24 to 1 ratio among the original constituents of the grog are preferred. The excess $TiO_2$ remaining after sintering typically appears as titania particles and/or deposits of metallic titanium in the densified chromic oxide interstices. Usually three to four percent $TiO_2$ can be found in the resulting refractories in chrome titanate in solid solution with the $Cr_2O_3$ and in the titania particles. Titania is also preferred as the densifying agent due to its relatively good glass corrosion resistance, ranking just behind chromic oxide and zirconia in that regard. Of course, lesser amounts of titania can be employed with the expectation that less densification and/or possibly less uniform densification may or will occur. One possible advantage is that free titania, titanium metal and/or other, free, titanium based refractory compounds may be eliminated from the sintered refractory.

Pigment grade chrome sesquioxides, about ninety-eight percent or more by weight $Cr_2O_3$ with a median particle size (50th mass percentile based on sedigraph analysis) of up to about seven microns and an oil absorption value of less than about 20 desirably between about 8 and 15, are suggested. Metallurgical grades are available and may be acceptable for certain uses but are not preferred, at least in the particle sizes in which those materials are typically offered by commercial sources. Pigment grade chrome sesquioxides at least ninety-eight percent by weight $Cr_2O_3$ and having a median particle size (50th mass percentile) of about two microns and oil absorption values in the range of about ten to fifteen were used in each of the following examples.

Pigment grade titanias, about ninety-eight percent $TiO_2$ with a median particle size (50th mass percentile based upon sedigraph analysis) of up to about ten microns, are preferred. Pigment grade titanias having median particle sizes (50th mass percentile) of between about 1.6 microns and 2.8 microns were used in the following examples. Metallurgical grade titanias are available but are believed to be undesirable, at least due to size, in the products typically offered by commercial suppliers.

In each of the following examples, chromic oxide is supplied by chrome sesquioxide or mixtures of chrome sesquioxide and fully densified chromic oxide grog. However, chromic oxide may also be supplied by aggregate which is less than fully densified or even undensified. It is further believed that chromic oxide grog (undensified and/or with any degree of densification) may be used as the exclusive source of chromic oxide in compositions of the present invention. At least about ten percent and preferably at least about fifteen percent by weight of such chromic oxide grog should be milled or otherwise reduced to particle sizes of less than about 10 microns, and desirably less than about 5 microns, to provide a fine fraction of chromic oxide to replace the chrome sesquioxide in filling voids and fostering bonding.

A minimum bulk density of about 240 lbs/ft$^3$ is believed required to assure adequate bonding strength of the sintered chromic oxide refractory. This can be achieved as explained herein by the provision of smaller size particles (median size less than 10, desirably less than 5 and preferably less than about 2 microns) of chromic oxide in adequate amounts and an amount of titania sufficient to induce the necessary or desired densification and bonding as well as by the use of conventional practices including precompacting the mix before firing and firing at least to about 1450° C. preferably in an essentially oxygen free atmosphere.

A densified chromic oxide matrix constituting at least about eighty percent by weight $Cr_2O_3$ is viewed as necessary to give the minimum glass corrosion resistance desired in any conceivable application requiring chromic oxide. Higher percentages of $Cr_2O_3$ are believed necessary to assure long term glass corrosion resistance at least equivalent to existing compositions which consist essentially of densified chromic oxide and include only about five to six percent by weight of $TiO_2$ and other refractory components. The precise amounts of zirconia, titania and other refractory components which are required or permitted will depend, to a large extent, upon the ultimate application of the composition.

Primary uses for refractory compositions of this invention are in the glass industry for inner furnace linings, flow blocks, bushing blocks and other bodies directly contacted by glass or slag, particularly highly corrosive glasses such a type E (textile) and insulating wool fiber glasses, borosilicate glasses and certain other glasses, and as outer (backup or safety) linings and other parts and in other furnace areas, for example the doghouse, not usually in direct glass/slag contact. They may find further use in the production of other, less corrosive glasses as well as in other areas where resistance to highly corrosive materials is required.

According to the invention, uniform mixtures are preferably prepared of sinterable components comprising and consisting essentially of chrome sesquioxide, chromic oxide grog or mixtures thereof with zirconia and titania, all in particulate form. Depending upon their compositions, these mixtures may be blended and formed dry into shapes or combined with appropriate binders and/or lubricants (e.g. polyethylene glycol, polyvinyl alcohol, glycol, lignin sulfonate, waxes, etc.) to add green strength and formed into shapes in conventional ways and fired to a sufficiently high temperature, in particular to a temperature between about 1450° C. and 1600° C. and preferably between about 1475° C. and 1525° C., to achieve maximum densification and chemical/ceramic bonding.

Fine-grain compositions, such as those of the following TABLES I and III, may be slip cast, spray dried or isostatically pressed using techniques normally associated with those methods of forming. Coarser compositions, such as those of the following TABLE VI, are typically mechanically pressed on impact and/or vibratory presses with steel molds. Compacting pressure in isostatic pressing is approximately 12,000 psi or higher. Equivalent compression is preferably used with coarser compositions using vibration and/or mechanical impact at different absolute pressures. Green compositions with binders or binders and lubricants may be dried, if necessary or desired, before firing. After firing, larger blocks of the sintered composition (typically about 1 to 3 ft$^3$) may be used directly or cut or ground to tight dimensional tolerances with diamond blades or diamond grinding wheels for use in the tank lining, the doghouse, as flow blocks, etc.

Eighteen examples with zirconia are provided in the following TABLES I, III and VI together with comparison Compositions A, B and C, each lacking zirconia. The eighteen examples are for illustrative purposes and are not intended to be restrictive as to the scope of the invention. Generally speaking, the compositions of TABLES I and III were fired together while the compositions of TABLE VI were fired in a separate firing.

Some of the important physical properties of the various compositions are further indicated in the tables. Density (bulk) is measured following ASTM C-20-74. Apparent (open) porosity is measured following ASTM C-20-74 modified: water is absorbed by vacuum impregnation at 26 inches of mercury for thirty minutes or boiling in water for two hours; sample size is about one inch cubes. Modulus of rupture ("MOR") is measured following ASTM C-133-72.

Thermal shock resistance is determined by cycling sintered bars approximately one inch by one inch by three inches (about 2.5×2.5×7.6 cm.) between a steel plate at room temperature and a furnace preheated to a temperature of about 1150° C. or 1400° C. at fifteen-minute intervals (i.e. fifteen minutes in the furnace followed by fifteen minutes on the plate followed by a return to the furnace). A sample is considered to fail the thermal shock test if, at any time during any cycle, it sustains a twenty-five percent or more weight loss. Mere cracking of the sample without separation does not constitute a failure for the purpose of this test. Samples surviving firing but not removal from the furnace are awarded one-quarter of one cycle. Samples failing while cooling are awarded one-half cycle. Samples surviving return to furnace are awarded a full cycle.

Glass corrosion rating is determined following ASTM C-621 (modified). According to this test a refractory sample approximately one cm. by one cm. by five cm. is immersed to a depth of about 1.25 cm. in a bath of molten glass for a five day period. At the end of the period, the sample is removed, split longitudinally and the depth of material loss from corrosion/erosion ("cut") on each half sample measured at the molten glass/air interface. The average cut of one sample is selected as a standard. The ratio of the selected average cut to the cut of each other sample when multiplied by 100 is the rating of the other sample with respect to the selected sample. In this way, ratings of less than 100 represent greater corrosion loss than that of the selected standard while ratings above 10 represent lesser corrosion loss than that of the selected standard.

The glass corrosion ratings of the compositions TABLES I and III are relative to that of comparison Composition B of TABLE III. By selection as the standard, comparison Composition B is assigned a glass corrosion rating of 100. Comparison Composition C of TABLE VII has been selected as the standard for the various compositions reported in that TABLE. All glass corrosion ratings are rounded to the nearest decade but even that degree of precision may be greater than is warranted by this particular test. Moreover, there is still concern that long term glass corrosion resistance will prove to be more directly related to $Cr_2O_3$ content. Accordingly, compositions having the highest $Cr_2O_3$ content while providing some thermal shock damage resistance improvement or the necessary thermal shock damage resistance are preferred.

At least one block of each composition was prepared. Laboratory size blocks were about four-and-one-half inches in diameter and about six inches in height. In some instances, "production" size blocks about 6.5 in.×6.5 in.×25 in. were prepared. To the extent permitted, two sample portions were taken from the same block for each reported test. Average values for two samples are presented for bulk density ("Avg. Density"), apparent (open) porosity ("Avg. App. Porosity") and MOR ("Avg. MOR"). Individual values are presented for "Thermal Shock Resistance Cycles" and "Glass Corrosion Resistance Rating". Because of the number of samples involved, not all tests were performed on all samples. Dashes are used in the following TABLES I, IV and VI to indicate tests which were not performed.

All indicated percentages in the following TABLES I through VII, except porosity, are by weight.

EXAMPLES 1 THROUGH 3

High density chromic oxide refractory compositions (bulk densities greater than about 285 lbs/ft³) were prepared from mixtures consisting essentially of chrome sesquioxide and titania at a uniform weight ratio (24 to 1) with varying amounts of unstabilized (monoclinic) zirconia (zero to five percent), all in particle form. The specific proportions by weight of sinterable components are indicated in the TABLE I.

Typical chemistry for sintered Composition A is about ninety-four and one-half percent by weight $Cr_2O_3$, between about 3.4 and 3.8 percent by weight $TiO_2$ and the remainder (about two percent or less) other ceramic components, mainly metallic titanium and other metallic oxides. $Cr_2O_3$ and $TiO_2$ are believed to reduce roughly in proportion to the zirconia additions in the Examples 1 through 3. Thus Examples 1 through 3 ranged between about ninety-four and eighty-nine percent $Cr_2O_3$, respectively. Although $Cr_2O_3$ was not measured directly in the samples, chromia content can be determined indirectly by fusing a chromic oxide sample with sodium peroxide to make the chromium soluble, boiling the sample with sulfuric acid, silver nitrate solution and an excess of potassium persulfate to oxidize the chromium, mixing the sample with sulfuric and phosphoric acids and then titrating the chromium with ferrous ammonium sulfate. The amount of most of the trace metallic oxides present can be determined by DC plasma analysis.

The chemistry and particle size distribution of the zirconia powder Z1 used in each of the Examples 1 through 3 are set forth in TABLE II.

The compositions of TABLE I were intensely dry mixed for about ten minutes, placed in a rubber bag, jolted and tapped to precompact, placed in an isopress vessel, pressurized to approximately 12,000 psi for about one minute, depressurized and removed from the bag. The green blocks were fired to a temperature throughout of between about 1475° C. and 1525° C. At temperatures above about 800° C., the oxygen level around the blocks was maintained below one percent and preferably below about one-half percent to provide an atmosphere essentially free of oxygen.

In the sintered examples, zirconia in essentially its original amounts was substantially uniformly dispersed in particle form through the composition. Bulk densities greater than 300 lbs/ft³ were achieved in all compositions.

TABLE I

| HIGH DENSITY CHROMIC OXIDES | | | | |
|---|---|---|---|---|
| | A | 1 | 2 | 3 |
| $Cr_2O_3$, % | 96 | 95 | 93 | 91 |
| $TiO_2$, % | 4 | 4 | 4 | 4 |
| $ZrO_2$, % (Z1) | 0 | 1 | 3 | 5 |
| Avg. Density, lbs/ft³ | 303 | 301 | 303 | 301 |
| Avg. App. Por., % | .12 | .4 | 2.4 | 3.0 |
| Avg. MOR, Ambient, PSI | 12,400 | 14,900 | 3,400 | 2600 |
| Thermal Shock Resistance | ¼ | 2 | 20+ | 20+ |
| Cycles Ambient 1150° C. | ¼ | 4 | 20+ | 20+ |
| Glass Corrosion Rating | | | | |
| Textile E Glass | 210 | 170 | 125 | 130 |
| 1500° C. 5 Days | 115 | — | 130 | 155 |

TABLE II

FINE MONOCLINIC ZIRCONIAS

| Chemistry, Wt. % | Z1 | Z2 | Z3 |
|---|---|---|---|
| $SiO_2$ | .5 | .9 | .8 |
| $Na_2O$ | .2 | — | — |
| $Al_2O_3$ | .1 | .3 | .3 |
| $TiO_2$ | .1 | .2 | .2 |
| $Fe_2O_3$ | .05 | .06 | .06 |
| CaO | .05 | — | — |
| $P_2O_5$ | .04 | — | — |
| MgO | .03 | — | — |
| Other ingredients (including volatiles) | .43 | .54 | .64 |
| $ZrO_2 + HfO_2$ (by difference) | 98.5 | 98.0 | 98.0 |
| Particle Size Distribution by Sedigraph Analysis | | | |
| Diameter-Microns (90th Mass Percentile) | 8.5 | 3.3 | 21.0 |
| Median Diameter-Microns (50th Mass Percentile) | 3.8 | 1.5 | 4.2 |
| Cum. Mass % <1 Micron | 8.0 | 35.0 | 21.0 |

Noticeable improvement to thermal shock damage resistance was observed by the addition of as little as one percent by weight unstabilized zirconia (an average of three cycles by Example 1 versus an average of one-quarter cycle by comparison Composition A). The addition of three percent unstabilized zirconia in Example 2 brought very significant increases in thermal shock resistance (twenty plus cycles). To place this improvement in perspective, samples of comparison Composition B (TABLE III) were not able to survive any cycles of the thermal shock test. Composition B has been used previously as the inner linings of textile E glass furnace tanks and was originally presumed to be superior to comparison Composition A in thermal shock damage resistance.

Although no test data is provided for compositions employing less than one percent by weight monoclinic zirconia, the increase in thermal shock cycles from one-quarter to three with the addition of only one percent zirconia and then to 20+ cycles with the addition of only three percent zirconia strongly suggests that observable improvement in thermal shock damage resistance can be achieved in these compositions by the use of even less than one percent monoclinic zirconia even perhaps as little as about one-quarter of one percent. In view of the fact that excess titania is preferably added and that lesser quantities of titania might be employed to bring about significant and even maximum densification while eliminating excess titania, improved thermal shock damage resistance and the highest glass corrosion rating might be achieved by adding to an original weight of chrome sesquioxide less than about three percent by weight titania and between about one-quarter and one percent by weight monoclinic zirconia to provide refractory consisting essentially of about densified chromic oxide for maximum glass corrosion resistance with zirconia for improved thermal shock damage resistance.

Although the data is limited and only generally rather than specifically representative of each of the compositions, the glass corrosion resistances of comparison Composition A and Examples 1 through 3 of TABLE I are judged to be generally comparable to one another and generally greater than those of comparison Composition B and Examples 4 through 13 of TABLE II at least as far as these short term corrosion tests indicate. The actual corrosion cuts of the two samples of comparison Composition B, selected as the corrosion standard, were about 0.15 and 0.16 mm., respectively.

In addition to superior glass corrosion resistance, another benefit of the compositions of TABLE I is that they can be prepared directly from commercially available raw materials which require no processing prior to mixing, forming and firing.

The compositions of TABLE I are viewed as being most useful in the high wear locations of the exposed inner lining (melting areas) of tanks of textile glass fiber furnaces. These include the bubbler area(s), the metal line (glass/air interface) and throat areas of the tank. These areas constitute about twenty-five percent of the exposed inner area of the tank. Compositions with between about one and three percent zirconia (Examples 1 and 2) and about ninety-one and ninety-three or more percent $Cr_2O_3$ are currently preferred with the lower zirconia content slightly preferred if it proves to provide adequate thermal shock damage resistance in use.

EXAMPLES 4 THROUGH 13

TABLE III, below, illustrates the effect of substituting approximately forty-five to fifty-five percent coarser chromic oxide aggregate in the form of densified chromic oxide grog, for the finer chrome sesquioxide to provide very dense chromic oxide compositions having average bulk densities within the range of about 55 to 285 lbs/ft$^3$.

TABLE III

VERY DENSE CHROMIC OXIDE

| | B | 4 | 5 | 6 | 7 | 8 | 9 | 10 | 11 | 12 | 13 |
|---|---|---|---|---|---|---|---|---|---|---|---|
| $Cr_2O_3$, % | 43.2 | 42.77 | 41.9 | 41.04 | 36.72 | 41.9 | 41.04 | 39.96 | 41.9 | 41.04 | 38.88 |
| $TiO_2$, % | 1.8 | 1.78 | 1.75 | 1.71 | 1.53 | 1.75 | 1.71 | 1.665 | 1.75 | 1.71 | 1.62 |
| 50% −325 Mesh Grog, % | 55 | 54.45 | 53.35 | 52.25 | 46.75 | 53.35 | 52.25 | 50.875 | 53.35 | 52.25 | 50.05 |
| $ZrO_2$, % (Z1) | 0 | 1 | 3 | 5 | 15 | | | | | | |
| (Z2) | | | | | | 3 | 5 | 7.5 | | | |
| (Z3) | | | | | | | | | 3 | 5 | 10 |
| Avg. Density, lbs/ft$^3$ | 273 | 273 | 274 | 267 | 263 | 274 | 275 | 275 | 273 | 272 | 270 |
| Avg. App. Por., % | 13.4 | 14.0 | 14.2 | 16.3 | 19 | 14.1 | 14.4 | 14.4 | 14.8 | 15.1 | 16.2 |
| Avg. MOR, Ambient | 11,200 | 9,800 | 5500 | — | — | 5500 | 2900 | 1950 | 6100 | 2150 | * |
| Thermal Shock Resistance | 0 | 0 | 0.5 | 5.5 | 15 | 5.5 | 20+ | 20+ | 2.5 | 15 | * |
| Cycles Ambient 1150° C. | 0 | 0 | 0.5 | — | — | 1.5 | 8 | 20 | 1.5 | 11.5 | * |
| Glass Corrosion Rating | | | | | | | | | | | |

TABLE III-continued

| | VERY DENSE CHROMIC OXIDE | | | | | | | | | |
|---|---|---|---|---|---|---|---|---|---|---|
| | B | 4 | 5 | 6 | 7 | 8 | 9 | 10 | 11 | 12 | 13 |
| Textile E Glass | 105 | — | — | 105 | — | — | 115 | — | — | — | * |
| 1500° C. 5 Days | 95 | — | — | 105 | — | — | 100 | — | — | — | * |

*Sample cracked during firing. Unable to obtain undamaged portion of sufficient size for tests.
—Test not made.

Composition B and Examples 4 through 13 of TABLE III were prepared in a manner identical to Composition A and Samples 1 through 3 of TABLE I. Again, the preferred 24 to 1 ratio of chrome sesquioxide to titania was maintained. Up to one-half of the indicated amount of grog in Composition B and in each of the Examples 4 through 13 may be from recycled densified chromic oxide blocks. The remainder of the grog is taken from newly fired refractories of Composition A of TABLE I which lack the glass, slag and other impurities of the recycled blocks.

Typical chemistry of Composition B is about ninety-three to ninety-four percent $Cr_2O_3$, about 3.4 to 3.8 percent $TiO_2$ and the remainder (about three percent or less) other refractory components, typically metallic titanium, other metal oxides and salts. Again, $Cr_2O_3$ and $TiO_2$ are believed to be reduced roughly in proportion to the additions of zirconia in Examples 4 through 13. Thus $Cr_2O_3$ in Examples 4 through 13 ranged generally between about ninety-three percent for Example 4 and about seventy-eight percent for Example 7. Neither the Example 7 composition nor the Example 13 composition with next lowest $Cr_2O_3$ content composition (eighty-three to eighty-four percent) are suggested for use as adequate or better thermal shock damage resistance performance is suggested or shown by Examples 10, 12 and possibly Example 9 with $Cr_2O_3$ contents about eighty-five percent or more $Cr_2O_3$.

Typical chemistry of recycled, densified chromic oxide blocks is given in TABLE IV. The chemistry is based upon an original composition ratio of about ninety-six percent by weight chromic oxide to about four percent by weight $TiO_2$ in the original blocks which carry approximately four additional percent or less by weight glass and glass by-product impurities in their open porosity. Typical particle size distribution of the 50% −325 Mesh grog used is given in TABLE V.

TABLE IV

| CHROMIC OXIDE GROG Typical Chemistry | |
|---|---|
| Element | % |
| $Cr_2O_3$ | 91.3 |
| $TiO_2$ | 3.6 |
| $Fe_2O_3$ | 0.4 |
| $ZrO_2$ | 0.05 |
| $SiO_2$ | 1.3 |
| $Al_2O_3$ | 0.8 |
| Others (CaO, MgO, other oxides and Alkali) | 2.5 |

TABLE V

| CHROMIC OXIDE GROG Typical Particle Size Distribution (50% −325 Mesh) | |
|---|---|
| Tyler Mesh No. | Cum. % on Screen |
| 65 | 4 |
| 100 | 12 |
| 150 | 25 |
| 325 | 50 |

TABLE III illustrates the physical effects of zirconias of differing particle sizes and distributions. The typical chemistry and particle size distributions of the three different zirconias tested, Z1, Z2 and Z3, are indicated in TABLE II. Examples 4 through 7 utilize exemplary zirconia Z1 of TABLE II. Examples 8 through 10 used exemplary Zirconia Z2 of TABLE II, having the finest particle sizes. Examples 11 through 13 used the exemplary zirconia composition Z3 having the largest median particle size. However, both it and the Z2 composition included significant fractions (twenty percent or more by weight) of zirconia particles less than one micron in diameter. Z2 was the only zirconia tested to include a major proportion by weight of particles less than two microns in diameter.

Again, measurable thermal shock damage resistance improvement is seen over the baseline comparison Composition B, by the addition of at least about three percent of any of monoclinic zirconias. The relatively better performance of the three percent additions of Z2 and Z3 zirconia (Examples 8 and 11) over the corresponding three percent Z1 composition (Example 5) suggests discernable thermal shock damage resistance improvement over the baseline B composition can be achieved by using less than three percent by weight of either of the Z2 or Z3 zirconias with more than fifty percent chromic oxide grog.

Increasing amounts of zirconia, regardless of type, appeared to improve thermal shock damage resistance. As can be seen by comparison of each of the three percent zirconia Examples (5, 8 and 11) with each of five percent zirconia Examples (6, 9 and 12), the Z2 composition appeared to consistently provide the most thermal shock damage resistance. The relatively superior thermal shock damage resistance performance provided by the finest grade of zirconia employed (Z2) suggests that even greater improvement in thermal shock damage resistance might be obtained by its use in place of the Z1 composition in Examples 1–3 of TABLE I and in Examples 14–18 of TABLE VI to follow.

To the extent data was available, glass corrosion resistance of these compositions with up to at least about five percent zirconia (about ninety-two percent or more densified chromic oxide matrix) was at least as good as that of the comparison Composition B. Again, generally speaking, glass corrosion resistance was deemed inferior to that of the compositions of TABLE I.

One advantage of the compositions of TABLE III is that they permit the recycling of used chromic oxide refractories.

The compositions of TABLE III are expected to be most useful for the greater part of the exposed inner lining (direct glass and/or slag contact) in the melting area textile glass fiber furnace tanks and in the fire hearth (approximately seventy-five percent of the exposed inner lining).

EXAMPLES 14 THROUGH 18

TABLE VI indicates the sinterable components and physical properties of dense chromic oxide compositions including a relatively high percentage (eighty percent) of coarse aggregates (grog) to provide bulk densities between about 240 and 255 lbs/ft$^3$. Composition C has a slightly lower $Cr_2O_3$ content than Composition B of TABLE III as a result of the additional other components (less than one additional percent) supplied through the additional grog. Chromic oxide content is believed to be between less than about ninety-four percent and about eighty-eight or more in Examples 14 through 18.

TABLE VII lists the particle distribution of the −10 Mesh and 4×10 Mesh grogs used in these compositions. Again up to about fifty percent of each of the grog fractions listed in TABLE VI, that is of the 4×10 Mesh and of the −10 Mesh, was supplied by recycled densified chromic oxide glass furnace blocks having the typical chemical composition stated in TABLE IV. Composition C is used as a standard for glass corrosion rating. In these compositions incorporating relatively coarse aggregates, the use of some recycled glass furnace blocks is preferred to add a small amount (about two percent less by weight) glassy material to increase cold crushing strength of the compositions.

TABLE VI

| | DENSE CHROMIC OXIDE | | | | | |
|---|---|---|---|---|---|---|
| | C | 14 | 15 | 16 | 17 | 18 |
| $Cr_2O_3$, % | 19.2 | 18.47 | 18.2 | 17.3 | 16.3 | 15.4 |
| $TiO_2$, % | .8 | .77 | .76 | .72 | .68 | .64 |
| 4 × 10 Mesh Grog % | 40 | 40 | 40 | 40 | 40 | 40 |
| −10 Mesh Grog, % | 40 | 40 | 40 | 40 | 40 | 40 |
| $ZrO_2$, % (Z1) | 0 | .76 | 1 | 2 | 3 | 4 |
| Avg. Density, lbs/ft$^3$ | 252 | 253 | 252 | 251 | 250 | 246 |
| Avg. App. Por., % | 19.7 | 18.3 | 18.8 | 20.2 | 21.1 | 22.7 |
| Avg. MOR, Ambient, PSI | 5700 | 4500 | 5200 | 5400 | 4000 | 2300 |
| Thermal shock resistance | 20+ | 20+ | 20+ | 20+ | 20+ | 20+ |
| Cycles Ambient 1150° C. | 20+ | 20+ | 3.5 | 20+ | 20+ | 20+ |
| Thermal Shock Resistance | 1 | 2 | 1 | 3 | 2 | 4 |
| Cycles Ambient 1400° C. | 1 | 1 | 1 | 2 | 1 | 4 |
| Glass Corrosion Rating | | | | | | |
| Textile E Glass | 115 | 150 | 100 | 115 | 95 | 85 |
| 1500° C. 5 Days (rounded) | 85 | 125 | 95 | 95 | 85 | 75 |

TABLE VII

| CHROMIC OXIDE GROG | |
|---|---|
| Tyler Mesh No. | Cum. % on Screen |
| Typical Particle Size Distribution (4 × 10 Mesh) | |
| 4 | 0 |
| 6 | 4 |
| 8 | 36 |
| 10 | 75 |
| 12 | 90 |
| 20 | 97 |
| −20 | 3 |
| Typical Particle Size Distribution (−10 Mesh) | |
| 10 | 2 |
| 14 | 9 |
| 20 | 25 |
| 28 | 39 |
| 35 | 49 |
| 325 | 80 |
| −325 | 20 |

To prepare the samples of TABLE VI, the sinterable components were mixed in the percentages indicated with a binder-lubricant system of lignin sulfonate and wax, mechanically pressed and fired to a temperature of at least about 1475° C. and 1525° C. throughout. Oxygen content of the furnace was not controlled due to the relatively minor portion of chrome sesquioxide present.

Generally speaking, increasing the percentage of aggregate over the compositions in TABLE III (forty-five percent to fifty-five percent) reduced the resulting bulk density, increased the apparent porosity and improved the thermal shock damage resistance of the chromic oxide compositions of TABLE VI. All of the Compositions C and Examples 14 through 18 appeared able to successfully survive at least 20 thermal shock cycles at 1150° C. One of the one percent zirconia samples of Example 15 broke after 3.5 cycles. However, in view of the successful cycling of all other samples, this test failure was believed to have probably resulted from rough handling of the sample. Thermal shock cycling between a steel plate at ambient temperature and a furnace at 1400° C. was conducted to better distinguish thermal shock damage resistance of the various compositions.

Again, generally speaking, improved thermal shock resistance accompanied the addition of increasing amounts of zirconia and appeared persistent with the addition of about two percent or more by weight monoclinic zirconia.

Glass corrosion resistances among the various compositions of TABLE VI appear generally equivalent, given the limited data. Actual corrosion cuts for the two comparison Composition C corrosion test samples were about 0.09 and 0.11 mm., respectively. Because the compositions of TABLES I and III were fired separately and thus under different conditions from those of TABLE VI, direct comparisons of the corrosion ratings between the compositions of TABLES I and III and the compositions of TABLE VI should not be made.

Another benefit of the compositions of TABLE VI are that they permit the use of even greater quantities of recycled densified chromic oxide glass furnace material and greater monetary credits to the user.

The compositions in TABLE VI are expected to be most useful for horizontal, electric-type, rotary charged, glass melting furnaces and standard furnaces for producing insulating wool fiber glass. They may also find application in textile E long fiber type furnaces in areas experiencing rapid thermal cycling and/or which are not subject to continuous or even prolonged exposure to molten glass or slag. These include, for example, the doghouse area and the back-up liner to the high density and very dense chromic oxide compositions of TABLES I and III, respectively, used in the inner liner of the glass melt tank.

It will be recognized by those skilled in the art that changes could be made to the above-described embodiments of the invention without departing from the broad inventive concepts thereof. It is understood, therefore, that this invention is not limited to the particular embodiments disclosed, but it is intended to cover any modifications which are within the scope and spirit of the invention, as defined by the appended claims.

We claim:

1. A densified chromic oxide refractory composition having a bulk density of at least about 204 lbs/ft³ and consisting essentially of at least eighty percent by weight $Cr_2O_3$, at least about one-half percent by weight $TiO_2$ and at least about one-quarter percent by weight monoclinic zirconia in particle form substantially uniformly dispersed through the composition.

2. The composition of claim 1 wherein the $Cr_2O_3$ is present in the refractory composition in an amount of at least about eighty-five percent by weight of the composition.

3. The composition of claim 2 wherein the $Cr_2O_3$ is present in the refractory composition in an amount of at least about eighty-eight percent by weight of the composition.

4. The composition of claim 2 wherein the $Cr_2O_3$ is present in the refractory composition in an amount of at least about ninety percent by weight of the composition.

5. The composition of claim 2 wherein the $Cr_2O_3$ is present in the refractory composition in an amount of at least about ninety-two percent by weight of the composition.

6. The composition of claim 2 wherein the bulk density is at least about 255 lbs/ft³.

7. The composition of claim 4 wherein the bulk density is at least about 255 lbs/ft³.

8. The composition of claim 5 wherein the bulk density is at least about 285 lbs/ft³.

9. The composition of claim 1 wherein inseparable refractory impurities from the $Cr_2O_3$, $TiO_2$ and monoclinic zirconia are present in the refractory composition in an amount of less than about five percent by weight of the refractory composition.

10. The composition of claim 2 wherein the $TiO_2$ is present in an amount of about six percent by weight or less of the refractory composition.

11. The composition of claim 10 wherein the $TiO_2$ is present in an amount of between about three percent and about four percent by weight of the refractory composition.

12. The refractory composition of claim 1 characterized by the presence of microcracks in the chromic oxide in the vicinity of the zirconia particles.

13. The composition of claim 1 consisting essentially of at least about ninety percent by weight $Cr_2O_3$, about one-half percent to about six percent by weight $TiO_2$, and about one-quarter percent to about six percent by weight monoclinic zirconia.

14. The composition of claim 12 wherein the inseparable refractory impurities are present in the refractory composition in an amount of about four percent or less by weight of the refractory composition.

15. The composition of claim 14 wherein the inseparable impurities are present in the refractory composition in an amount of only about to percent or less by weight of the refractory composition.

16. A method of making a densified chromic oxide refractory having improved thermal shock damage resistance comprising the steps of:
    forming a green composition of mixed sinterable components into a shape, the sinterable components consisting essentially of at least eighty percent by weight $Cr_2O_3$ provided by particles selected from the group consisting essentially of chrome sesquioxide, chromic oxide grog and mixtures thereof, at least about one-half percent by weight $TiO_2$, and at least about one-quarter percent by weight monoclinic zirconia particles; dispersed substantially uniformly therethrough and
    heating the green composition shape to a temperature of at least about 1450° C. throughout to sinter and densify the green composition.

17. The sintered refractory shape formed by the method of claim 16.

18. The method of claim 16 wherein the chromic oxide is present in the sinterable components in an amount of at least about eighty-eight percent by weight of the sinterable components.

19. The sintered refractory shape formed by the method of claim 18.

20. The method of claim 18 wherein the monoclinic zirconia is present in the sinterable components in an amount of up to about five percent by weight of the sinterable components.

21. The sintered refractory shape formed by the method of claim 20.

22. The method of claim 20 wherein the mixture of sinterable components consist essentially of chrome sesquioxide, monoclinic zirconia and titania.

23. The sintered refractory shape formed by the method of claim 22.

24. A green composition of mixed sinterable components, the mixed sinterable components consisting essentially of: at least eighty percent by weight $Cr_2O_3$ provided by particles selected from the group consisting essentially of chrome sesquioxide, chromic oxide grog and mixtures thereof, at least about one-half percent $TiO_2$ and at least about one-quarter percent by weight monoclinic zirconia in particle form dispersed substantially uniformly through the composition.

25. In a glass melting furnace, a densified chromic oxide refractory composition block having a bulk density of at least about 240 lbs/ft³, a weight of at least 240 lbs., and consisting essentially of at least eighty percent by weight $Cr_2O_3$, at least about one-half percent by weight $TiO_2$ and at least about one-quarter percent by weight monoclinic zirconia in particle form dispersed substantially uniformly through the refractory block.

26. The green composition of claim 24 wherein the sinterable components consist essentially of particles of chrome sesquioxide, titania and zirconia.

27. The green composition of claim 24 wherein the sinterable components collectively consist essentially of:

80% to about 95% by weight $Cr_2O_3$,
about 2% to about 6% by weight $TiO_2$, and
about 1% to about 15% by weight $ZrO_2$ and $HfO_2$.

28. The composition of claim 27 wherein the sinterable components collectively consist essentially of about 2% to about 10% by weight of $ZrO_2$ and $HfO_2$, about 2% to about 6% by weight $TiO_2$ and about 84% to about 95% by weight $Cr_2O_3$.

29. The block of claim 25 consisting essentially of particles of titania and particles of zirconia distributed through a predominantly chromic oxide matrix.

30. The block of claim 29 consisting essentially of:
80% to about 95% by weight $Cr_2O_3$,
about 2% to about 6% by weight $TiO_2$, and
about 1% to about 15% by weight $ZrO_2$ and $HfO_2$.

31. The block of claim 30 consisting essentially of about 2% to about 10% by weight $ZrO_2$ and $HfO_2$, and 2% to about 6% by weight $TiO_2$ and about 84% to about 95% by weight $Cr_2O_3$.

32. A densified chromic oxide refractory composition having a bulk density of at least about 240 lbs/ft$^3$ and consisting essentially of at least eighty percent by weight $Cr_2O_3$, at least about one-half percent by weight $TiO_2$, at least about one-quarter percent by weight monoclinic zirconia in particle form substantially uniformly dispersed through the composition, and glass in at least an amount sufficient to increase cold crushing strength of the composition.

33. The composition of claim 32 wherein the $Cr_2O_3$ is present in an amount of at least about eighty-five percent by weight of the composition.

34. The composition of claim 32 wherein the $Cr_2O_3$ is present in an amount of at least about eighty-eight percent by weight of the composition.

35. The composition of claim 32 wherein the $Cr_2O_3$ is present in an amount of at least about ninety percent by weight of the composition.

36. The composition of claim 33 wherein the $TiO_2$ is present in an amount of about six percent by weight or less of the composition.

37. The composition of claim 36 wherein the $TiO_2$ is present in an amount of between three and about four percent by weight of the composition.

38. The composition of claim 32 characterized by the presence of microcracks in the composition in the vicinity of at least a major proportion of the zirconia particles.

39. The composition of claim 32 consisting essentially of at least about eighty-five percent by weight $Cr_2O_3$, about one-half percent to about six percent by weight $TiO_2$, about one-quarter percent to about eight percent by weight monoclinic zirconia and up to about three percent by weight glass.

40. The composition of claim 39 wherein the glass is present in an amount of about two percent or less by weight of the refractory composition.

41. A method of making a densified chromic oxide refractory having improved thermal shock damage resistance comprising the steps of:
forming a green composition of mixed sinterable components into a shape, the sinterable components consisting essentially of at least eighty percent by weight $Cr_2O_3$ provided by chromic oxide particles selected from the group consisting essentially of chromic oxide grog, chrome sesquioxide and mixtures thereof, at least about one-half percent by weight $TiO_2$, at least about one-quarter percent by weight monoclinic zirconia particles and glass in at least an amount sufficient to increase cold crushing strength of the green composition after sintering; and
heating the green composition shape to a temperature of at least about 1450° C. throughout to sinter the green composition.

42. The sintered refractory shape formed by the method of claim 41.

43. The method of claim 41 wherein the $Cr_2O_3$ is present in an amount of at least about eighty-five percent by weight of the sinterable components.

44. The sintered refractory shape formed by the method of claim 43.

45. The method of claim 43 wherein the glass is present in an amount of about two percent or less by weight of the sinterable components.

46. The sintered refractory shape formed by the method of claim 45.

47. The composition of claim 41 wherein the sinterable components collectively consist essentially of about 2% to about 10% by weight of $ZrO_2$ and $HfO_2$, about 2% to about 6% by weight $TiO_2$, about 82% to about 93% by weight $Cr_2O_3$ and about 2% or less by weight glass.

48. The sintered refractory shape formed by the method of claim 47.

49. The method of claim 48 further comprising the initial step of providing at least part of the chromic oxide grog and the glass of the sinterable components mixture from recycled, glass furnace chromic oxide blocks.

50. The sintered refractory shape formed by the method of claim 49.

51. A green composition of mixed sinterable components, the mixed sinterable components consisting essentially of: at least eighty percent by weight $Cr_2O_3$ provided by chromic oxide particles selected from the group consisting essentially of chromic oxide grog, chrome sesquioxide and mixtures thereof, at least about one-half percent $TiO_2$, at least about one-quarter percent by weight monoclinic zirconia in particle form dispersed substantially uniformly through the composition, and glass in an amount sufficient to increase cold crushing strength of the green composition after sintering.

52. The green composition of claim 51 wherein the sinterable components collectively consist essentially of:
about 82% to about 94% by weight $Cr_2O_3$,
about 2% to about 6% by weight $TiO_2$,
about 1% to about 10% by weight $ZrO_2$ and $HfO_2$, and
about 3% or less by weight glass.

53. The green composition of claim 52 wherein the sinterable components collectively consist essentially of about 2% to about 8% by weight of $ZrO_2$ and $HfO_2$, about 2% to about 6% by weight $TiO_2$, about 84% to about 94% by weight $Cr_2O_3$ and about 2% or less by weight glass.

54. In a glass melting furnace, a densified chromic oxide refractory composition block having a bulk density of at least about 240 lbs/ft$^3$ and a weight of at least 240 lbs. and consisting essentially of at least eighty percent by weight $Cr_2O_3$, at least about one-half percent by weight $TiO_2$, at least about one-quarter percent by weight monoclinic zirconia in particle form dispersed substantially uniformly through the refractory composition and glass in an amount sufficient to increase cold crushing strength of the block.

55. The block of claim 54 consisting essentially of:
about 82% to about 94% by weight $Cr_2O_3$,
about 2% to about 6% by weight $TiO_2$,
about 1% to about 10% by weight $ZrO_2$ and $HfO_2$, and
about 3% or less by weight glass.

56. The block of claim 55 consisting essentially of about 2% to about 8% by weight $ZrO_2$ and $HfO_2$, about 2% to about 6% by weight $TiO_2$, about 84% to about 94% by weight $Cr_2O_3$ and about 2% or less by weight glass.

* * * * *